United States Patent [19]

Siler

[11] Patent Number: 4,828,287

[45] Date of Patent: May 9, 1989

[54] SAFETY HEAD PROTECTOR FOR VEHICLE CABS

[76] Inventor: Joseph Siler, 877 Rellia Dr., Terrell, Tex. 75160

[21] Appl. No.: 135,913

[22] Filed: Dec. 21, 1987

[51] Int. Cl.$^4$ ............................................. B60R 21/04
[52] U.S. Cl. .................................... 280/751; 297/397; 297/410
[58] Field of Search ................. 280/751; 297/397, 410

[56] References Cited

U.S. PATENT DOCUMENTS

| 3,328,083 | 6/1967 | Bourne | 297/397 |
| 4,607,886 | 8/1986 | Mazhar | 297/410 |
| 4,619,483 | 10/1986 | Dickey et al. | 297/397 |

OTHER PUBLICATIONS

J. C. Whitney & Co., Part & Accessories Catalog No. 473 B, Aug. 1986, p. 44, Item No. 12-5485u Protective Headrest.

Primary Examiner—Kenneth R. Rice
Attorney, Agent, or Firm—T. D. Copeland

[57] ABSTRACT

A safety head protector for use in a pickup truck cab or other vehicle with a rear window immediately behind the occupant's head. The protector is made of a foam cushion mounted on a sturdy support and covered by an outer cover. The protector is mounted onto the rear window glass by fasteners which allow vertical position adjustment. The support behind the foam cushion acts to prevent the occupant's head from breaking the rear window glass, which the foam cushion alone would not.

3 Claims, 1 Drawing Sheet

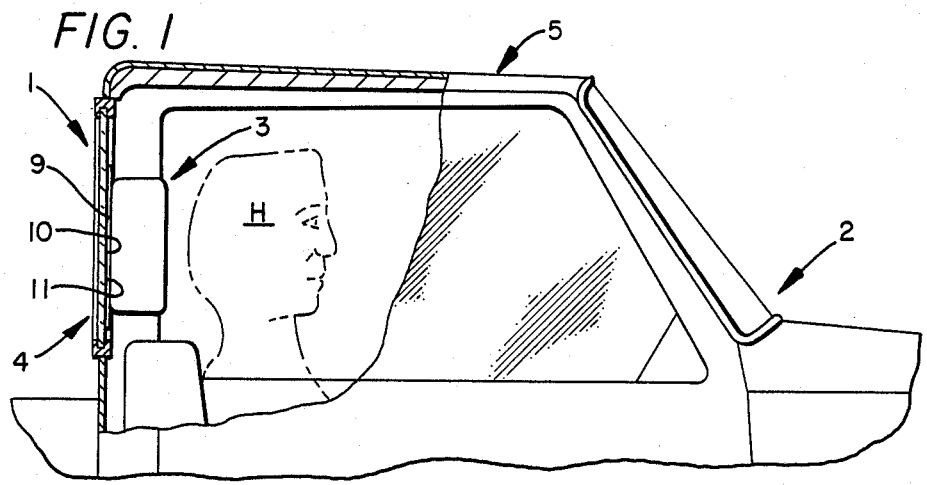
FIG. 1
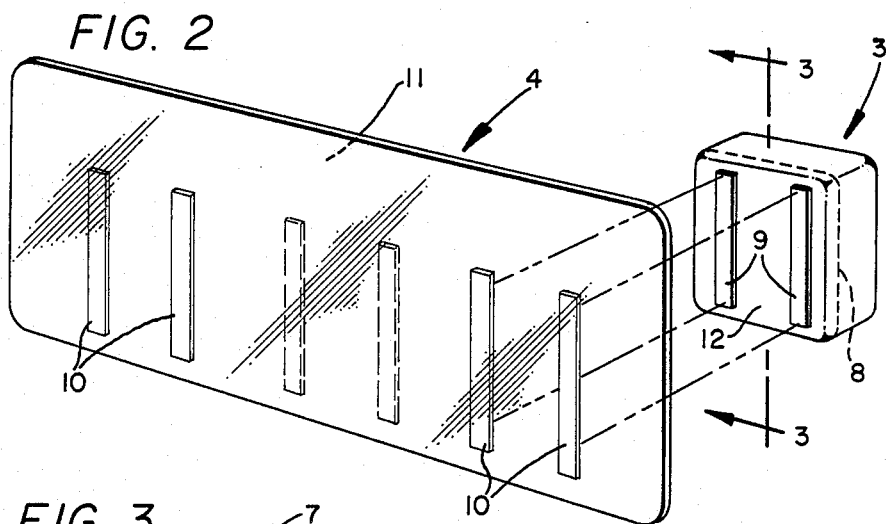
FIG. 2
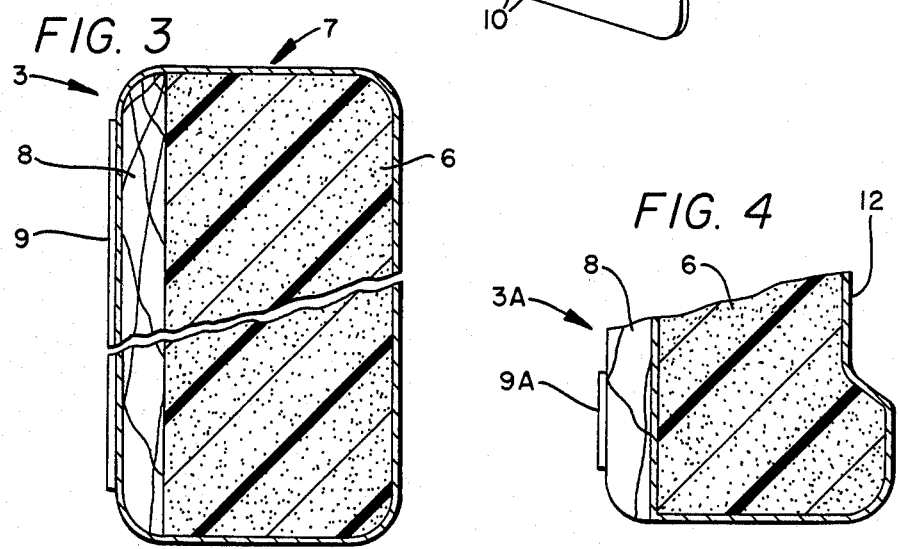
FIG. 3
FIG. 4

SAFETY HEAD PROTECTOR FOR VEHICLE CABS

OBJECTS OF THE INVENTION

A primary object of this invention is to provide a head protector for drivers and passengers of motor vehicles which include a cab, and wherein the driver's seat is slightly ahead of the rear window of the vehicle.

Many passenger cars today include a head rest for the comfort and safety of the driver and front seat passenger, but generally, no such product is provided for the driver or for the passenger of cab type vehicles. such as pick-up trucks. It is a principal object of this invention to provide such a product and feature for this group of motor vehicles.

The head rest most commonly used in passenger cars is attached to the upper portion of the factory installed seat in an adjustable holder that is built into the seat during its manufacture. There is no such holder provided in the seats normally supplied with this category of vehicles, which we will refer to generally throughout this specification as "cab-type" for identification purposes, but not for limitation. It is therefore another object to provide a safety head protector in the form of an accessory for such vehicles for which the manufacturer has made no such provision for occupant safety.

The instant invention is directed to providing a device that will assist in reducing the number of whip-lash and other injuries that may occur in collisions. For example, in pick-up trucks that include bench type seating, there is generally no head rest provided, and it is often the case that upon impact with another vehicle, a driver's head will be snapped backward and even into and breaking the rear cab window. However, with this invention, the driver's head will never reach the rear window because of a protective cushion and support that is interposed between the driver (or passenger) and the rear window.

BACKGROUND OF THE INVENTION

As noted above, the prior art includes head rests that are attached to the top rear of the vehicle seat, and are generally adjustable. Examples of this art are U.S. Pat. Nos. 4,527,834, to John Zyngier; 4,199,191, to Jean Schneider; 3,608,965, to Kurt Cziptschirsch; and there are other patents that stress the shock absorbing qualities of specific headrests, such as: 4,440,443 to to Robert Nordskog; 4,256,341 to Walter Goldner; 4,411,948 to R. V. Otis Perkey; 3,865,450 to Matthias Bruening; 4,565,405 to Camille Mayer; and 3,706,472 to Wolfgang Mertens. And there are patents directed to seat attached devices strictly for comfort of the passengers, such as 3,608,964 to T. J. Earl. However, none of these disclosures are used, or are they suitable for use in a cab-type vehicle for the Applicant's purpose in combination with the existing bend type of seat that is usually found in cab-type vehicles. Nor are any of these prior art inventions adapted to be installed directly to the rear cab window glass, and to then function as a much needed safety feature solely by virtue of such installation, with the added feature of being adjustable from its position of installation on the rear window glass, exclusively.

In contradistinction to the existing prior art, this invention is directed primarily to providing a head protector, particularly for cab-type vehicles to eliminate or drasticly reduce head injuries to the driver and passengers that often or may occur in vehicular collisions. Such protection is provided by the use of a window attached resilient cushion that includes a substantial and sturdy support member between a person's head and the normally exposed rear window of a cab.

Another benefit in the use of this product should be to substantially reduce premiums on collision and liability insurance for truck operators and owners of vehicles in which this head rest is installed; but the most important feature here is the protection it affords to the personal safety of the driver and passengers of the vehicles employing this key invention.

BRIEF DESCRIPTION OF THE DRAWING

FIG. 1 is a fragmentary cut-away view of a cab-type vehicle showing the installation of the safety head protector of this invention;

FIG. 2 is a perspective view of the cab rear window detached from the vehicle and showing the safety pack in a detached and exploded projection;

FIG. 3 is a cross-sectional view of the safety pack protector taken along the lines 3—3 of FIG. 2.

FIG. 4 is a fragmentary sectional view similar to FIG. 3, of a modified embodiment.

DESCRIPTION OF THE PREFERRED EMBODIMENTS

Referring now more particularly to the characters of reference on the drawing, it will be observed in FIG. 1, that the combination, identified at 1, of the cab-type vehicle 2, and the safety head protector 3, supported entirely from the rear window 4, of the cab 5, broadly depict the scope and function of this invention. The safety head protector 3 is variously referred to as a "safety pack", "safety member", "head protector", and combinations of these terms. Also it might be referred to loosely as a "head rest", altho this function is incidental to its predominant function of providing the important safety feature of preventing head injuries to occupants of the vehicle.

The safety pack 3, per se, is shown in section in FIG. 3 to comprise a compressible interior bulk 6 of a foam plastic or rubber or similar material, which is covered completely by a thin durable flexible plastic or other suitable material cover 7. Within the cover 7 and adjacent the cushion bulk 6, is a generally semi-rigid support 8, which acts as a guard to protect an occupant's head (indicated at H in phantom outline in FIG. 1) in the event of a collision. On the outside of the cover 7 at the back of the protector unit 3, when the unit is in its installed orientation, there is located one or more vertically installed strips of fastener halves 9 of the hook and pile type (one version being known by the trademark VELCRO), referred to hereafter as "fasteners", which are spaced apart the same distance as the other fastener halves 10, which are attached to the inside surface 11 of the rear cab window 4 by a pressure applied adhesive (not shown) of the same type that causes the fastener strip 9 to adhere to the back surface 12 of the safety pack 3, all as shown in FIGS. 1 and 2.

After the fastener strips 10 are applied to the rear window 4, in vertical orientation and at the approximate location that the driver and the other occupant(s) would occupy, the safety pack 3 is ready for installation by simply engaging its velcro strips 9 with the selected pair of fastener strips 10 and applying a reasonable amount of pressure to cause these matching velcro strips to securely engage. Thereafter, the driver and one or two passengers may proceed to travel with an added element of safety.

FIG. 4 shows another embodiment of the safety pack 3, in which the sturdy support member 8 is located outside of the protective cover 7, and the fastener strips 9A are attached directly to the back side of support member 8 and are of shortened length. Safety pack 3A may also include a recessed area as shown at 12 in FIG. 4, and its thickness may be enlarged to actually touch the back of the occupant's head H, so that safety pack 3A would specifically function as a head rest as well as a head protector.

This invention is not limited to the specific embodiments disclosed herein, but may be made in many ways that fall within the spirit of this invention as defined by the scope and structure of the appended claims and equivalents thereof:

What is claimed:

1. In a vehicle having an occupant seat and a closely adjacent rear window glass, the combination, comprising:
   a. a safety pack member comprising a foam material interior for installation directly onto said rear window glass and in longitudinal alignment with the occupant relative to the normal direction of travel of said vehicle, and wherein said member is retained and totally supported by and from said glass,
   b. a sturdy protective support member of a size comparable to that of the occupant's head, installed adjacent the back side of said safety pack member,
   c. a cushion member of foam material of a size comparable to the size of said support member, engaging the front side of said support member and the occupant's head,
   d. an outer cover member of durable non-foam flexible material surrounding said cushion of foam material, and attached to said support member,
   e. at least one fastener member half attached in matching relationship to aligned locations on both the back side of said safety pack member and the inside surface of said rear window glass,
   f. means on the back side of one said fastener member half, and on the forward facing side of said other fastener member half to permit adjustable location of, and total support for said pack member on said vehicle rear window glass,
   g. means in said cushion member for acting as a barrier to restrain rearward motion of the occupant's head during a collision of moderate intensity, and
   h. means in said support member for acting as an additional barrier to restrain further rearward movement of the occupant's head during a collision of increased intensity, wherein the occupant's head could break the rear window glass were it not for said support member being interposed between the occupant and the rear window glass.

2. A safety pack member as in claim 1 for a cab type vehicle having a bench type front seat and a rear cab window glass closely adjacent said seat, wherein said cushion member is comprised of foam material, and wherein said protective support member is comprised of a substantially more dense, sturdy and rigid material than said foam material, and wherein said flexible material outer cover surrounds only said foam material.

3. A safety pack member as in claim 1, wherein both said protective support member and said cushion member are enclosed within said flexible outer cover.

* * * * *